United States Patent Office 3,232,776
Patented Feb. 1, 1966

3,232,776
FUSED CAST ARTICLES AND METHOD OF MAKING THE SAME
Raymond E. Birch, Pittsburgh, Pa., assignor to Harbison-Carborundum Corporation, Falconer, N.Y., a corporation of Delaware
No Drawing. Filed May 12, 1964, Ser. No. 366,882
2 Claims. (Cl. 106—59)

This invention relates to fused cast refractory shapes made by fusing a mass of refractory material of the desired composition to the molten condition, casting the fused material while molten into suitable molds, and cooling the cast material under controlled conditions to form a monolithic article of the desired size and shape. The invention is particularly concerned with articles of the desired type made from fusions of chromite ore with magnesia and alumina in such proportions as to provide a refractory product of improved physical characteristics adapted especially for use in the steel industry, but not necessarily restricted to such use.

This application is a continuation-in-part of my earlier application Serial No. 53,679, filed September 2, 1960, and now abandoned.

Fusion cast refractories are well established in certain industries, particularly glass-making. In the main the furnaces where cast refractories have been highly successful are those wherein there is no great fluctuation in temperature or drastic changes in atmospheric conditions. In general this does not characterize steel plant furnaces, and particularly it does not describe the open hearth steel furnace where temperatures vary greatly during each heat or melt and atmospheres are more subject to drastic change.

The nature of the open hearth steel furnace with its pervasive fumes of iron oxide, and the splash and spray of basic slags, requires the use of refractories resistant to basic oxides. The most common basic refractory materials are lime, magnesia, and chrome ore, the latter sometimes spoken of as a neutral refractory. The principal use of lime as a refractory is in the form of dead burned dolomite used alone or in blends with magnesia. My invention does not refer to these lime-containing refractories which have certain limitations which must be avoided. Instead, I am primarily concerned with fused cast basic refractories containing chromite ore, magnesia and alumina as the major and essential constituents.

In early attempts to adopt fused cast basic refractories to furnaces in which steel is produced, the raw batch was, in some cases, merely chrome ore. These ores are comprised principally of spinel minerals of varying composition, and show on analysis MgO, $Al_2O_3$, FeO (and sometimes $Fe_2O_3$), $Cr_2O_3$, and small amounts of accessory oxides. A range of compositions was studied but there was difficulty in producing sound castings, and particularly in attaining any appreciable degree of resistance to the stresses which arise from changes in temperature and atmospheric conditions encountered within steel furnaces.

Later efforts to improve the physical properties, and especially the thermal shock resistance, of basic compositions in fused cast form have resulted in the development of fused cast refractory shapes composed of fusions of chromite ore and magnesia wherein the MgO content of the fused refractory is increased to a level above that found in native chromite ores. It has been suggested also that the ratio of divalent oxides (MgO and FeO) to trivalent oxides ($Al_2O_3$, $Cr_2O_3$ and $Fe_2O_3$) be so controlled as to assure the presence of periclase (crystalline MgO) as a major constituent. For example, Magri, U.S. Patent No. 2,599,566, discloses a fused cast refractory of basic character designed for use in the metals industry. That patent covers a fused cast refractory composed of chromite ore and magnesite (magnesia). The product is one containing, according to the broad claims, from 5 to 25% alumina and from 5 to 25% FeO, and in the narrower claims from 5 to 15% $Al_2O_3$ and from 9 to 17% FeO. Experience with products representative of those covered by this patent has shown that when they are exposed to alternating conditions of oxidizing and reducing, they undergo a very marked dimensional change reflected in a linear growth amounting to several percent. This excessive growth, when exposed to alternating reducing and oxidizing gases in use, renders the refractory product highly objectionable because of its failure after short periods of use under such conditions.

Apparently recognizing the poor performance of products made from a mixture of chromite ore and magnesite in which the content of iron oxide was high, Magri sought to improve the product by avoiding the presence of substantial amounts of FeO in the product by selecting a chromite ore that would be low in iron oxide or by preliminarily removing most of the iron oxide. With this apparent concept in mind, the second Magri patent, No. 2,690,974, issued on chromite ore-magnesia fused cast refractories wherein the iron oxide or FeO was maintained below 5%, presumably although not so stated by the patentee, in order to improve its resistance against growth when exposed to fluctuating conditions of oxidation and reduction in use. Therefore, in order to bring the performance of the resulting product to an acceptable level with respect to resistance against such conditions, Magri found it necessary to reduce markedly the percentage of iron oxide in his product by the judicious selection of a chromite ore which would not introduce large amounts of FeO into the product or by first removing most of the FeO from his chromite ore.

Such was the state of the prior art when the present applicant entered the picture. Magri had taught the art the use of fused cast refractories composed of a fusion of chromite ore and magnesia, and further taught in his second patent, that better results were to be obtained by the selection of chromite ores of low iron content so that the resulting refractory shape would contain less than 5% of FeO. However, such fused cast products made from fusions of chromite ore and magnesia were lacking in an ability to stand up and resist growth when exposed to fluctuating conditions of oxidation and reduction in use. The industry still needed a basic cast refractory that could be made utilizing low cost chromite ores of high iron oxide content and that would undergo negligible change when exposed to fluctuating oxidizing and reducing conditions during use.

I have discovered that the appropriate combination of physical characteristics and properties required to successfully meet the severe fluctuating oxidizing and reducing conditions can be achieved by means of the use of the less expensive chromite ores of high iron oxide content by the addition to the mixture of chromite ore and magnesia (magnesite) a sufficient amount of alumina beyond that contained in the chromite ore to bring the total content of $Al_2O_3$ in the finished product above 25% by weight. In other words, I have discovered that it is not necessary to use a chromite ore containing a small amount of FeO or to first remove most of the iron oxide from the ore, but that it can be left in the product without detrimental effect if alumina is added in sufficient amounts to compensate for the iron oxide. In fact, I have found that maintenance of the $RO:R_2O_3$ within broad limits, of itself, is by no means a dependable guide, assuming as it does, the equivalence of such unlike oxide pairs as $Cr_2O_3$–$Al_2O_3$ and MgO–FeO. I have found that it is important to maintain the proportions of oxide constituents so that the molar ratio of RO to $R_2O_3$ oxides is within the relatively narrow range between 1.1 and 3.1, and furthermore, the weight ratio of $Al_2O_3/MgO$ is between 0.6 and 1.0. The mineralogy of these systems is extremely involved, but it is clear that important advantages result from avoiding an excessive periclase phase in such compositions, although the benefits of the presence of some lesser amounts of periclase in enhancing heat shock resistance are recognized. In fused refractories made from magnesia and chrome ore, the avoidance of excessive periclase is accomplished by adding alumina in such amounts as will unite much of the periclase in stable mineralogical entity with the alumina although, according to my preferred practice sufficient of the periclase phase is retained to provide adequate resistance to heat shock that the resultant cast body will stand up under reasonably severe fluctuating temperature conditions. Thus I find for the reasons given above that alumina is the third substantial and essential batch ingredient and the resulting fused refractory has a crystalline structure comprised of stable mineral aggregates, generally more aluminous than the chrome ore.

I have found further and most importantly, that with the addition of a substantial amount of alumina over and above the amount found in natural chromite ores, the resulting refractories, even when they contain a high percentage of iron oxides, predominantly FeO, in excess of 7% by weight of the finished product, have a greatly decreased tendency to develop the continual growth in service which is apparently a primary factor in the failure of other kinds of fused basic refractories, particularly those made essentially of chrome ore and magnesia without such additions of alumina.

While I do not wish to be limited by any theory herein propounded, it is my belief that the introduction of the alumina in substantial amount into a basic mixture of iron oxide-containing chromite ore and magnesia has a pronounced beneficial effect and improves the performance properties of the resulting cast shape because of the stabilizing influence of the alumina on the tendency of such basic compositions to undergo alterations in their chemicophysical structure when subjected to fluctuating temperatures and environmental changes in use. Pursuing this concept further, the presence of both alumina and magnesia in substantial amounts contributes to greater stability as a result of the normal existence of both of these named oxides at one valence or oxidation level irrespective of their surrounding environment, whereas by contrast chromium oxide is known to exist in at least two different valences or oxidation levels and iron oxide exists at at least three different and commonly recognized, valences or oxidation levels. Consequently, under changing environmental conditions of use, it is understandable why the presence of greater amounts of alumina, in preference to chromium oxide, has a stabilizing influence under fluctuating operating conditions.

Representative analyses of the raw materials used in practicing the present invention are given in table below.

TABLE I

Chemical analyses

| Oxide | Iron oxides | MgO | $Al_2O_3$ | $Cr_2O_3$ | $SiO_2$ | CaO |
|---|---|---|---|---|---|---|
| Raw material: | | | | | | |
| Calcined Philippine chromite ore | 13.7 | 20.6 | 27.9 | 31.1 | 5.4 | 0.6 |
| Calcined Transvaal chromite ore | 25.1 | 10.3 | 16.6 | 42.1 | | |
| Magnesia | 0.3 | 94.5 | 0.4 | | 3.6 | 1.2 |
| Alumina | | | 99.5 | | | |

My successful compositions are limited to those having $Al_2O_3$ in excess of 25% by weight (to mineralogically tie up the magnesia and compensate for the iron oxide present in the chromite ore) and up to 55% by weight of alumina, and with $Cr_2O_3$ less than 21% by weight but over 9% by weight. Higher percentages of chromic oxide combine less stably with MgO than does $Al_2O_3$ and in higher amounts, $Cr_2O_3$ tends to unmix from solid solution to free an oxide phase which is not stable to changing atmospheres. The addition of alumina to bring the $Al_2O_3$ content above 25% by weight permits the use of chromite ores of high iron oxide content, such as Transvaal ores and still obtain a product that is highly resistant to change under alternating oxidizing and reducing conditions at elevated temperatures, despite the presence in the product of in excess of 7% by weight of FeO. BgO is the third and remaining primary constituent of these refractory fusions, and while the usable range can be described only roughly as 23 to 48%, it is possible to govern its use rather precisely by the following principle: With the composition so controlled that MgO and $Al_2O_3$ comprise more than 60% (preferably 70% minimum) of the mix, and less than 88%, I find that the problem of an excessive periclase phase can be minimized if the ratio by weight of $Al_2O_3$ to MgO is kept within the range of 0.6 to 1.0, this being merely the practical means of providing $Al_2O_3$ in such amount as will prevent the occurrence of any appreciable corundum or excessive periclase as major crystalline phases and to offset the otherwise adverse effect of high iron oxide content.

So long as the analysis and batch requirements are followed as herein prescribed I have found that it is possible to produce excellent fused basic refractories utilizing raw materials which have previously been deemed unsatisfactory for the production of cast refractories for one reason or another. They fuse and cast satisfactorily, with an acceptable degree of control of void formation, and are good sound products. In tests simulative of those met with in the open hearth steel furnace, they give every evidence of being successful in this field of service.

Table II below gives examples of specific raw batch compositions which suitably lend themselves to the manufacture of fused cast refractory articles in accordance with the teachings of the present invention. Other examples of Table II are representative of the prior art and are given for purposes of comparison to illustrate the advantages to be derived from following the practice of the present invention, as indicated by the relative performance factors of the two types of products.

Referring further to Table II below, in addition to the raw batch compositions, the table sets forth the percentages of $Al_2O_3$, $Cr_2O_3$, MgO, and iron oxides, the iron oxides being predominantly FeO, the $RO/R_2O_3$ mol ratio, the $Al_2O_3/MgO$ weight ratio, and results of the cyclic test, for each of the mixes. Mixes 3 and 6 are representative of the present invention in that they present products that have been made from a type or amount of chromite ore that introduces a heretofore undesirably high amount of iron oxides into the product in excess

TABLE II

| Mix No. | Raw batch composition | Percent oxides by spectro-chemical analysis | | | | RO/R$_2$O$_3$, mol ratio | Al$_2$O$_3$/MgO, weight ratio | Percent linear growth as result of 800 cycles of cyclic oxidation-reduction test at 1,200° C. |
|---|---|---|---|---|---|---|---|---|
| | | Al$_2$O$_3$ | Cr$_2$O$_3$ | FeO | MgO | | | |
| 1 | 50% Transvaal chromate ore<br>50% magnesia | 8.4 | 21.5 | 11.2 | 52.5 | 6.6 | .16 | +7.6 |
| 2 | 50% Transvaal chromite ore<br>40% magnesia<br>10% alumina | 15.1 | 20.4 | 10.7 | 49.0 | 4.8 | .30 | +0.9 |
| 3 | 45% Transvaal chromite ore<br>35% magnesia<br>20% alumina | 32.0 | 20.3 | 9.9 | 36.3 | 2.3 | .88 | +0.3 |
| 4 | 50% Philippine chromite ore<br>50% magnesia | 12.8 | 17.2 | 6.2 | 60.0 | 6.5 | .21 | +0.7 |
| 5 | 40% Philippine chromite ore<br>30% magnesia<br>30% alumina | 37.5 | 15.7 | 4.6 | 39.6 | 2.2 | .95 | +0.1 |
| 6 | 56% Philippine chromite ore<br>34% magnesia<br>10% alumina | 25.8 | 17.5 | 7.3 | 44.1 | 3.1 | .60 | +0.29 | of 7% by weight, but in which the high iron oxide content, in accordance with the present invention, is offset by the inclusion of sufficient Al$_2$O$_3$ to bring the alumina content above 25% by weight, and consequently provide a superior resistance of the product to growth when exposed to alternative oxidizing and reducing conditions.

The cyclic test consisted of placing specimens, 7 inches x ½ inch x ½ inch, cut from the blocks in a furnace chamber and raising the temperature of the chamber and the specimens contained in the chamber to a temperature of 1200° C. After the specimens had been brought to a temperature of 1200° C., they were subjected to a flow of reducing gases through the furnace for 15 minutes, after which they were subjected to a flow of air through the furnace chamber for 15 minutes, and the flow of reducing gases and air alternated at 15-minute alternating intervals. The test was carried on for a total of 800 cycles, each of which consisted of one 15-minute exposure to the flow of reducing gases at 1200° C. followed by a 15-minute interval of the flow of an exposure to air at 1200° C. for 15 minutes. The specimens were exposed to a total of 800 cycles after which the furnace was cooled down, the specimens removed and measured to determine the amount of linear growth or change from the dimensions of the specimens prior to exposure to the test. Experience has shown that generally it can be expected that the relative behavior of a product when subjected to the test will reflect the level of performance to be obtained when that product is used under similar service conditions.

As shown by comparison of the results of the cyclic test set forth in Table II for Mixes 1, 2 and 3, I found that a specimen taken from a fused cast block made from a mixture of equal parts of Transvaal chromite ore and magnesia exhibited a growth as a result of 800 cycles of the cyclic test, of 7.6% (see Mix 1 of Table II), whereas a specimen taken from a fused cast refractory block made from Mix 2 in which 10% of Al$_2$O$_3$ was used to replace a part of the magnesia, when subjected to 800 cycles of the same cyclic test, exhibited a linear growth of only 0.9%. Referring to Mix 3, when still more Al$_2$O$_3$ is added beyond that added in Mix 2 to replace some of the magnesia and chromite ore of Mix 1, I found that the growth when subjected to the same cyclic test was reduced to 0.3%.

In other words, Mixes 1 and 2 which were made from a chromite ore containing a high percentage of iron oxides so as to introduce an excessive amount of FeO into the product, and with no alumina added in the case of Mix 1, and with insufficient alumina added in the case of Mix 2, were lacking in ability to resist change when exposed to 800 cycles of the cyclic test. In contrast, Mix 3, which was made in accordance with the teachings of the present invention wherein sufficient alumina was added to bring the Al$_2$O$_3$ content above 25%, the resulting product, despite the high FeO content, had an extremely good resistance to change when exposed to the same test.

The remaining mixes of Table II show the outstanding results to be obtained by the addition of alumina to a chromite ore-magnesite (magnesia) batch in sufficient amount to bring the Al$_2$O$_3$ content above 25% by weight, when the chromite ore is present in sufficient amount to introduce FeO in moderate to excessive amounts to the product. The cyclic test results show a two- to six-fold improvement in the performance factor when adequate alumina is added.

Certain further general observations can be made. For example, it is noted that compositions resulting in cast articles having superior heat shock resistance are those in which the RO to R$_2$O$_3$ ratio is at least 2.0 and in which the amount of periclase, based on petrographic examination, is in excess of 10%. No particular correlation between the various individual compositions and the ability to resist corrosion by molten slag can be drawn from the results of the exposure of the resulting fused bodies to a slag drip test other than that the presence of relatively large amounts of alumina does not have any apparent detrimental effect upon the corrosion resistance of such bodies, and that in all instances the resistance to corrosion is at a satisfactorily high level.

It is particularly interesting to note that in every instance the resulting cast shape made in complete accordance with the teachings herein showed an outstanding ability to resist alteration (as reflected by excessive shrinkage or growth) when subjected to a cyclic oxidation-reduction test designed to simulate actual cyclic changes in furnace atmosphere such as the cyclic conditions found in regenerative checker brick installations.

In the production of basic refractories of the herein described type any of the usual chromite ores can be used, although the teachings of the present invention show the way in which less expensive chromite ores of high iron oxide content can be used effectively with highly satisfactory results in contrast with the previous necessity of selecting a higher grade ore to avoid presence of excessive iron oxide. However, regardless of the specific chromite ore used, the preferred practice is to subject it to a high temperature calcination at 800° C. or above prior to fusion in order to obtain maximum density in the fused cast products. However, the proportion of chromite ore to the alumina and magnesia ingredients must be adjusted in accordance with the specific oxide analysis of the ore used to provide an oxidic balance in the finished products as taught herein. Any raw batch material, including pure oxides, can be used providing the compositions resulting therefrom conform by oxide analysis, to the teachings set forth.

The making of fused cast refractories is well known in the art. Briefly, the raw materials, usually after thorough admixture and blending, are fused in an open top, pot type arc furnace (as, for instance, that disclosed in U.S. Patent No. 929,517 to F. J. Tone) and similar to that used in the production of synthetic alumina abrasives.

In carrying out the fusion, the furnace generally consists of a water-cooled iron shell, having no other lining than that built up by the material being fused as it is fed into the furnace. Fusion is effected initially by the heat from a carbon train between two or more carbon or graphite electrodes inserted in the iron shell, but after a bath of molten material is formed the resistance of this molten material to the passage of electric current therethrough is used to supply heat. The material is gradually fed in, and the electrodes raised as the fused mass is built up. The procedure followed is substantially similar to that employed in making ordinary aluminous abrasives. When the material has arrived at the proper temperature and the correct degree of fluidity, it is poured into molds of the desired shape and size.

The molded pieces are left in the mold for heat treatment or, particularly in the case of iron molds, are taken from the molds shortly after the outer walls of the casting have solidified. Thereafter, they are carefully cooled by any of the methods well known in the art, and after they are cold, any objectionable remainder of the header or other minor roughness is removed by chipping or grinding.

Having described the invention in detail, it is desired to claim:

1. A fused cast refractory article comprising, by oxide analysis, about 32% by weight $Al_2O_3$, about 36% by weight MgO, about 10% by weight FeO, and about 20% by weight of $Cr_2O_3$, said article having an RO to $R_2O_3$ molar ratio of about 2.3 and an $Al_2O_3$ to MgO weight ratio of about 0.88.

2. A method of making fused cast refractory articles which comprises preparing a raw batch mixture of chromite ore, magnesite and alumina in such proportions to provide a fused material having an oxide analysis of 32% by weight $Al_2O_3$, about 36% by weight MgO, about 10% by weight FeO, and about 20% by weight of $Cr_2O_3$, said article having an RO to $R_2O_3$ molar ratio of about 2.3 and an $Al_2O_3$ to MgO weight ratio of about 0.88.

References Cited by the Examiner
UNITED STATES PATENTS
2,599,566  6/1952  Magri _____ 106—59

TOBIAS E. LEVOW, *Primary Examiner.*